(12) United States Patent
Takahashi et al.

(10) Patent No.: US 6,932,504 B2
(45) Date of Patent: Aug. 23, 2005

(54) HEATED SELF-DETECTING TYPE CANTILEVER FOR ATOMIC FORCE MICROSCOPE

(75) Inventors: Hiroshi Takahashi, Chiba (JP); Yoshiharu Shirakawabe, Chiba (JP); Tadashi Arai, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

(21) Appl. No.: 10/395,683

(22) Filed: Mar. 24, 2003

(65) Prior Publication Data

US 2004/0028119 A1 Feb. 12, 2004

(30) Foreign Application Priority Data

Mar. 25, 2002 (JP) .......................................... 2002-082548

(51) Int. Cl.⁷ .............................. G01K 7/02; G01B 7/28
(52) U.S. Cl. ...................... 374/179; 374/142; 374/164; 136/225; 136/233; 73/105
(58) Field of Search .............................. 73/105, 204.26; 250/306, 307; 374/164, 179, 142, 208; 136/225, 233; 338/229

(56) References Cited

U.S. PATENT DOCUMENTS

| | | | | |
|---|---|---|---|---|
| 4,478,076 A | * | 10/1984 | Bohrer | 73/204.16 |
| 4,747,698 A | * | 5/1988 | Wickramasinghe et al. | 374/6 |
| 5,069,419 A | * | 12/1991 | Jerman | 251/11 |
| 5,388,323 A | * | 2/1995 | Hopson et al. | 374/142 |
| 5,396,066 A | * | 3/1995 | Ikeda et al. | 250/306 |
| 5,441,343 A | * | 8/1995 | Pylkki et al. | 374/164 |
| 5,559,330 A | * | 9/1996 | Murashita | 250/306 |
| 5,581,083 A | * | 12/1996 | Majumdar et al. | 250/306 |
| 5,838,005 A | * | 11/1998 | Majumdar et al. | 250/306 |
| 5,929,438 A | * | 7/1999 | Suzuki et al. | 374/164 |
| 5,959,241 A | * | 9/1999 | Sriram et al. | 136/228 |
| 5,969,238 A | * | 10/1999 | Fischer | 73/105 |
| 5,986,261 A | * | 11/1999 | Lewis et al. | 374/164 |
| 6,016,686 A | * | 1/2000 | Thundat | 73/23.2 |
| 6,095,679 A | * | 8/2000 | Hammiche et al. | 374/43 |
| 6,189,374 B1 | * | 2/2001 | Adderton et al. | 73/105 |
| 6,200,022 B1 | * | 3/2001 | Hammiche et al. | 374/43 |
| 6,389,886 B2 | * | 5/2002 | Daniels et al. | 374/45 |
| 6,422,069 B1 | * | 7/2002 | Shimizu et al. | 73/105 |
| 6,652,139 B2 | * | 11/2003 | Cordes et al. | 374/179 |
| 6,679,625 B2 | * | 1/2004 | Cordes et al. | 374/43 |
| 6,692,145 B2 | * | 2/2004 | Gianchandani et al. | 374/185 |
| 2002/0174715 A1 | * | 11/2002 | Kim et al. | 73/105 |
| 2002/0178801 A1 | * | 12/2002 | Takahashi et al. | 73/105 |
| 2003/0112844 A1 | * | 6/2003 | Cordes et al. | 374/29 |

OTHER PUBLICATIONS

A. Majumdar et al., "Thermal imaging by atomic force microscopy using thermocouple cantilever probes", Rev. Sci. Instrum. 66(6), pp. 3584–3592 (Jun. 1995).*

* cited by examiner

Primary Examiner—Gail Verbitsky
Assistant Examiner—Stanley J. Pruchnic, Jr.
(74) Attorney, Agent, or Firm—Adams & Wilks

(57) ABSTRACT

A self-detecting type cantilever for an atomic force microscope (AFM) has an electro-flexural conversion element for converting a flexural amount of the cantilever into an electric current or voltage, a temperature measurement element disposed at a front end portion of the cantilever for measuring a temperature, and a heating element disposed at the front end portion of the cantilever for heating the temperature measurement element. The temperature measurement element and the heating element are superposed with each other on a main face of the cantilever via an electrical insulating layer. As a result, even if the amount of electric energy supplied to the heating element is reduced, it is possible to effectively supply an amount of heat necessary for measurement to the temperature measurement element. Therefore, by minimizing the heat to be supplied to a sample and the cantilever, the respondency of measurement is improved and temperature measurement can be performed with a high degree of accuracy.

5 Claims, 4 Drawing Sheets

HEATED SELF-DETECTING TYPE CANTILEVER FOR ATOMIC FORCE MICROSCOPE

BACKGROUND OF THE INVENTION

1. Field of the Invention

The present invention relates to a temperature measurement probe for measuring a thermal physicality in a minute region on a surface of a sample and a temperature measurement apparatus.

2. Description of the Related Art

For example, in order to manufacture a heat distribution mapping in a minute range on a surface of a sample, conventionally, temperature measurement using AFM an atomic force microscope (AFM) on a minute scale is performed by forming an electric element for detecting a temperature at a front end of a probe for AFM measurement and measuring a temperature from its detected output.

As a temperature measurement probe used for such an object a conventional probe is constructed in such a manner that a thermoelectric couple is formed at a front end of a probe for measurement, and a resistor element for heating is formed in the vicinity of the thermoelectric couple element. This conventional temperature measurement probe serves to perform a temperature measurement in a minute range of a surface of a sample in such a manner that the thermoelectric couple is left at a constant temperature by applying a current for heating to the resistor element, and a temperature change of the thermoelectric couple generated by a heat exchange between the probe and a sample, which is generated by approaching the probe to the sample, is electrically detected.

According to the above described conventional temperature measurement probe, in order to improve respondency of the temperature measurement of the sample, it is desirable that a distance between the thermoelectric couple and the resistor element for heating is reduced as much as possible. However, since a wiring pattern of the resistor element should be disposed on a cantilever of the probe for measurement so as not to contact a wiring pattern of the thermoelectric couple, there is a limit in reduction of the distance between the two. In this manner, since the thermoelectric couple and the resistor element are forced to be wired at a predetermined distance, there is a defect such that, in the case that the distance is increased, electric power consumption at the resistor element, which is necessary for supplying the necessary heat to the thermoelectric couple, is increased, and further, when a great deal of heat is generated at the resistor element, a surface temperature of the sample is increased, and temperature measurement is not capable of being performed correctly.

Further, the thermoelectric couple and the resistor element for heating are generally wired on the cantilever of the probe. Therefore, there is also another defect such that, if a great deal of current is applied to the resistor element, the heat generated by this current largely increases the flexure amount to be generated in the cantilever, so that an error is generated in the information regarding the height of the probe from the surface of the sample.

SUMMARY OF THE INVENTION

The present invention has been made taking the foregoing problems into consideration, and an object of the present invention is to provide a temperature measurement probe and a temperature measurement apparatus capable of solving the above-described problems in the conventional technology.

In order to attain the above described object, according to the present invention, a wiring portion on the cantilever of the temperature measurement probe has a two-layered structure, in which the two layers are electrically isolated with each other, the thermoelectric couple and the resistor element for heating are formed on other wiring layer, and the thermoelectric couple and the resistor element for heating are arranged so that they are superposed with each other on a substantially same position on the cantilever.

The present invention provides a temperature measurement probe in which a measurement element for measuring a temperature and a heating element for heating the measurement element are provided at a front end portion of a cantilever; wherein, the measurement element and the heating element are formed so as to be superposed with each other on a main face via an electric insulating layer.

Since the measurement element and the heating element are arranged so as to be superposed with each other on a main face via an insulating layer, it is possible to dispose the both together on the main face of the cantilever, at a position which is most suitable for the measurement. As a result, even if the electric energy supplied to the heating element is reduced, it is possible to effectively supply the amount of heat necessary for measurement to the measurement element. Therefore, by minimizing the heat to be supplied to the sample and the cantilever, the respondency of measurement is capable of being improved noticeably.

According to the present invention, the temperature measurement probe further comprises a self-detecting type temperature measurement probe, in which an electro-flexural conversion element for detecting a flexural amount of the cantilever is formed on the probe.

In this manner, according to the structure such that an electro-flexural conversion element such as a piezoelectric element is disposed on a proper position on the probe so as to detect a flexural amount of the cantilever, as compared to a structure such as an optical lever such that the external energy for detection is supplied to the cantilever to increase a temperature of the cantilever, the number of elements for increasing the temperature of the cantilever is capable of being decreased, so that the improvement of the measurement accuracy may be expected.

In addition, the present invention provides a temperature measurement probe in which a measurement element for measuring a temperature and a heating element for heating the measurement element are provided at a front end portion of a cantilever; wherein, the measurement element and the heating element are formed so as to be superposed with each other on a main face via an electrical insulating layer, and a pair of the measurement elements is provided at the opposite ends of the heating element. In this structure, a self-detecting type temperature measurement probe may be also configured as a result that an electro-flexural conversion element for detecting the flexural amount of the foregoing cantilever is formed on the probe.

According to the present invention, in addition, a temperature measurement apparatus has the above described temperature measurement probe and measures a temperature of a minute region on a surface of a sample by approximating the front end portion of the foregoing temperature measurement probe to a surface to be measured of a sample.

DETAILED DESCRIPTION OF THE INVENTION

With reference to the drawings, an example of an embodiment according to the present invention will be described below.

Figure 1:
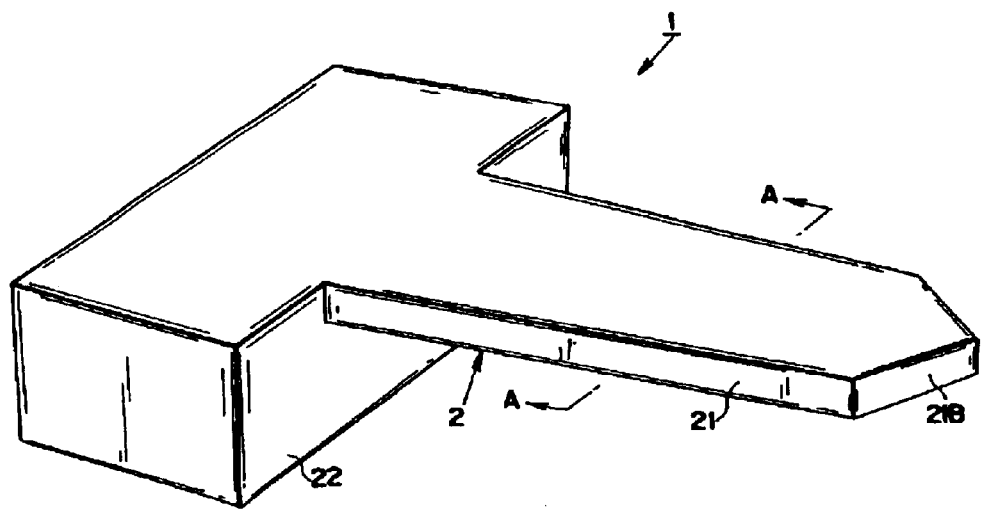
FIG. 1 is an external perspective view for showing an example of an embodiment of a temperature measurement probe according to the present invention.
Figure 2:
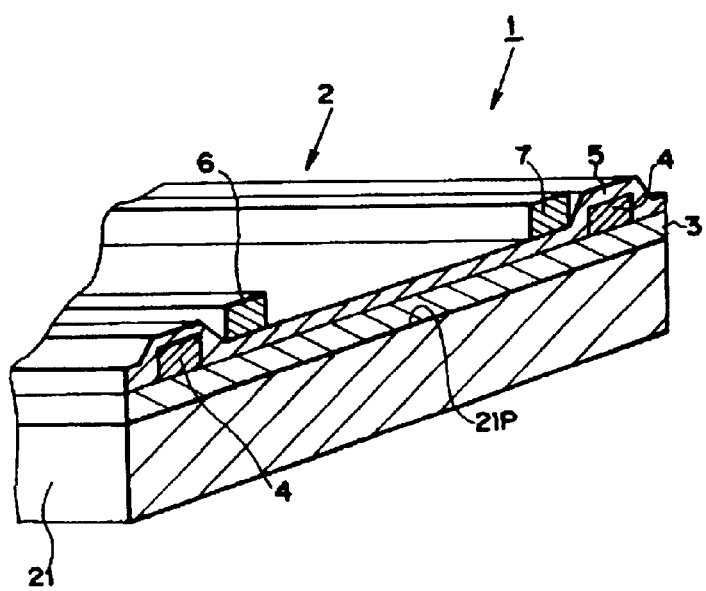
FIG. 2 is a cross sectional perspective view cut by an A—A cut line in FIG. 1.

FIG. 1 is an external perspective view and schematically shows an example of an embodiment of a temperature measurement probe according to the present invention. FIG. 2 is a cross sectional perspective view taken along an A—A cut line in FIG. 1. In a temperature measurement probe 1, a first insulating layer 3 made of silicon oxide ($SiO_2$) is formed on a main face 21P of a cantilever section 21 of a probe body 2 in a thin plate form made of silicon (Si), and a heater wire 4 made of chromium (Cr) as a resistor element for heating is formed on a the first insulating layer 3 in a film wire form. Further, a surface of the main face 21P may be formed as the resistor element for heating by ion implantation.

A second insulating layer 5 made of silicon oxide ($SiO_2$) is formed on a the heater wire 4. Then, on the second insulating layer 5, a thermoelectric couple working as a measurement element for detecting a temperature is formed and further, a first metal film wire 6 and a second metal film wire 7 are formed as a drawing interconnection of the thermoelectric couple. According to the present embodiment, the first metal film wire 6 is made of chromium (Cr) and the second metal film wire 7 is made of nickel (Ni).

Figure 3:
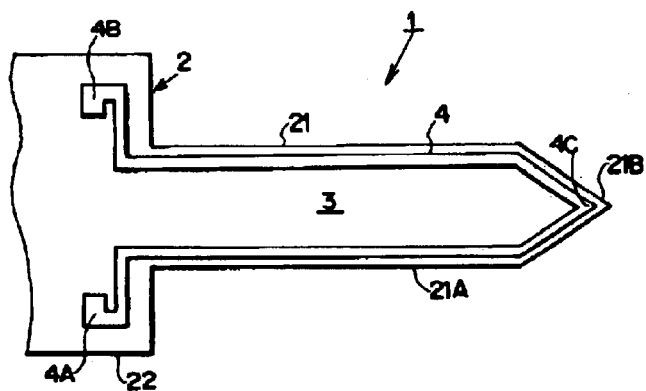
FIG. 3 is a view for showing a heater wire that is formed on a first insulating layer of the temperature measurement probe shown in FIG. 2.

FIG. 3 shows a wiring construction of a heater wire 4 that is formed on the first insulating layer 3. The heater wire 4 is shaped to form a film wire member that is relatively narrow and it is wired along a peripheral edge 21A of the cantilever section 21 of the probe body 2. Further, one end of the heater wire 4 is formed as a connection end 4A on a basal part 22 of the probe body 2 and another end of the heater wire 4 is formed as a connection end 4B on the basal part 22 of the probe body 2.

As described later, the connection ends 4A and 4B are connected to a pair of electrodes so as to electrically connect the heater wire 4 to an external circuit.

Figure 4:
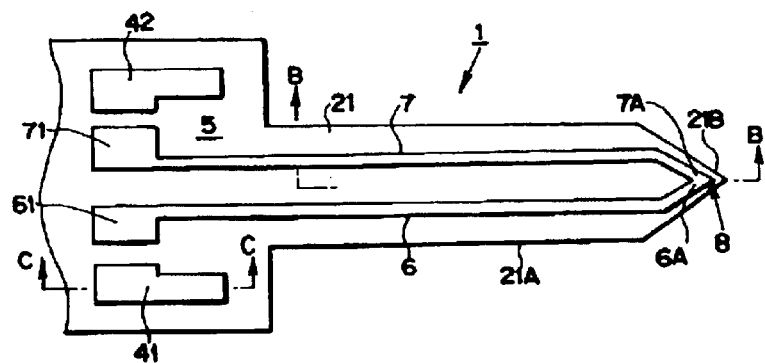
FIG. 4 is a plan view of the temperature measurement probe shown in FIG. 2.

FIG. 4 is a plan view of the temperature measurement probe 1. In FIG. 4, a wiring construction of the first metal film wire 6 and the second metal film wire 7, which are formed on the second insulating layer 5, is illustrated. The first metal film wire 6 is also shaped to form a film wire member that is relatively narrow and it is wired along a peripheral edge 21A of the cantilever section 21 of the probe body 2, however, the first metal film wire 6 is arranged so as to be inside the heater wire 4 (refer to FIG. 3). Then, in the vicinity of a front end portion 21B as a measurement section of the cantilever section 21, a front end portion 6A of the first metal film wire 6 is formed directly above a peak 4C of the heater wire 4 (refer to FIG. 3). A rear end portion of the first metal film wire 6 is elongated to the surface of the basal part 22, so that an electrode part 61 is formed so as to be electrically connected to the external circuit.

The second metal film wire 7 is also shaped in a film wire member that is relatively narrow as same as the first metal film wire 6 and it is wired along a peripheral edge 21A of the cantilever section 21 of the probe body 2, however, the second metal film wire 7 is arranged so as to be inside the heater wire 4, namely, it is arranged so as to be line symmetrical to the first metal film wire 6. Then, at the front end portion 21B as a measurement section of the cantilever section 21, a front end portion 7A of the second metal film wire 7 is formed directly above the peak 4C of the heater wire 4 (refer to FIG. 3) so that the front end portion 7A of the second metal film wire 7 overlaps the front end portion 6A of the first metal wire 6 with each other. A rear end portion of the second metal film wire 7 is elongated to the surface of the basal part 22, so that an electrode part 71 is formed so as to be electrically connected to the external circuit.

In this way, the first metal film wire 6 and the second metal film wire 7 are formed on the second insulating layer 5 so that front end portion 7A overlaps the front end portion 6A with each other on the peak 4C. As a result, one thermoelectric couple 8 is formed by a junction between the front end portion 6A and the front end portion 7A.

Figure 5:
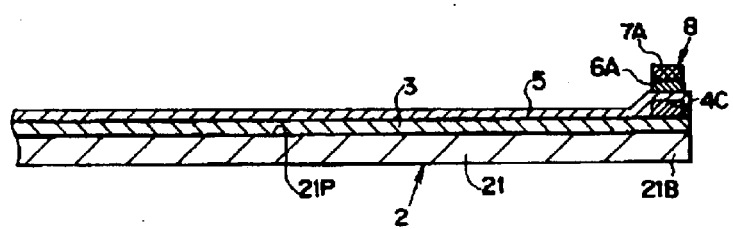
FIG. 5 is a cross sectional view cut by a B—B cut line in FIG. 4.

FIG. 5 is a cross sectional view taken along a B—B cut line in FIG. 4. As seen from FIG. 5, at the front end portion 21B as the measurement section of the cantilever section 21, a thermoelectric couple 8 formed by a junction between the front end portion 6A of the first metal film wire 6 and the front end portion 7A of the second metal film wire 7 is arranged and superposed directly above the peak 4C of the heater wire 4 via the second insulating layer 5. Accordingly, by applying current to the heater wire 4, it is possible to heat the thermoelectric couple 8 very effectively via the second insulating layer 5 due to the heat generated in the heater wire 4.

In FIG. 4, reference numerals 41 and 42 denote electrodes. Here, the electrode 41 is electrically connected to the connection end 4A and the electrode 42 is electrically connected to the connection end 4B.

Figure 6:
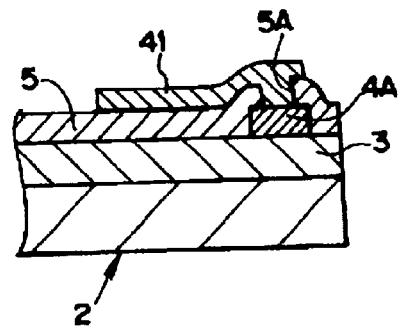
FIG. 6 is a cross sectional view cut by a C—C cut line in FIG. 4.

FIG. 6 shows an electrical connection condition between the electrode 41 and the connection end 4A. In FIG. 6, the heater wire 4 is electrically connected to the connection end 4A via a window 5A, which is defined on the second insulating layer 5. The electrical connection between the electrode 42 and the connection end 4B is also carried out in the same way.

Since the temperature measurement probe 1 is constructed as described above, a heat is generated due to the resistance of the heater wire 4 as a result that the electrodes 41 and 42 are connected to the external heating power source supply circuit and the current is applied to the heater wire 4. The thermoelectric couple 8 is arranged with superposed above the peak 4C of the heater wire 4 via the second insulating layer 5, and the thermoelectric couple 8 is kept electrically isolated due to the heater wire 4 and the second insulating layer 5. Thus, a distance between the thermoelectric couple 8 and the heater wire 4 is very short, so that, as compared to a conventional case, the current to be applied to the heater wire 4 for heating the thermoelectric couple 8 so as to be put in a required condition for measurement becomes very small. Further, it is possible to remarkably improve the respondency of the temperature change due to the thermoelectric couple 8 as compared to the conventional case.

Accordingly, the cantilever section 21 is not heated in an undesirable manner, and further, a sample that is close to the cantilever section 21 is not heated, so that it is possible to perform the temperature detection with a high degree of accuracy and with a high respondency.

According to the above described embodiment, a single thermoelectric couple 8 is formed by the first metal film wire 6 and the second metal film wire 7, and this thermoelectric couple 8 is formed directly above the peak 4C of the heater wire 4 via the second insulating layer 5. The temperature measurement probe according to the present invention is not limited to this embodiment.

Figure 7:
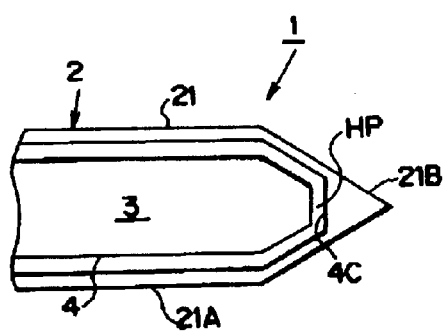
FIG. 7 is a plan view for showing a wiring construction of a heater wire of another embodiment according to the present invention.
Figure 8:
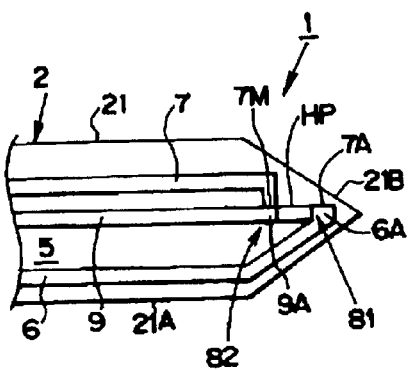
FIG. 8 is a plan view for showing a wiring construction for a thermoelectric couple according to another embodiment shown in FIG. 7.

In the next place, another embodiment according to the present invention will be described with reference to FIG. 7 and FIG. 8. The another embodiment according to the present invention to be described with reference to FIG. 7 and FIG. 8 is different from the above described embodiment in that a pair of thermoelectric couples 81 and 82 is arranged so as to sandwich a heating point HP at the front end portion 21B of the cantilever section 21. Accordingly, at each part in FIG. 7 and FIG. 8, the same reference numerals are given to the parts corresponding to each part of the above described embodiment.

In the heating point HP, a shape of the peak 4C of the heater wire 4 is not a dogleg shape (elbowed shape) shown in FIG. 3, but is a clamp shape (two-elbowed shape). Then, the front end portion of the second metal film wire 7 is bent in a crank shape so as to pass through a substantial center portion of the cantilever section 21. Further, the front end portion of the second metal film wire 7 is elongated to the front end portion 21B to join the front end portion 6A of the first metal film wire 6. Then, a first thermoelectric couple 81 is formed at the outside of the electrode 41, a third metal film wire 9, which is made of the same material as that of the first metal film wire 6, is arranged so as to be elongated to a center portion of the cantilever section 21 in in its axial direction, and a front end portion 9A of the third metal film wire 9 joins a fold portion 7M of the second metal film wire 7. As a result, the second thermoelectric couple 82 is formed at the inside of the peak 4C.

In this way, the first thermoelectric couple 81 and the second thermoelectric couple 82 are formed so as to sandwich the heating point HP shaped in horseshoe of the peak 4C, so that the heat from the heating point HP is evenly provided to the first thermoelectric couple 81 and the second thermoelectric couple 82. As a result, it is possible to detect the temperature change due to the heat exchange between the sample and the front end portion 21B of the cantilever section 21 with high sensitivity and high degree of accuracy.

Figure 9:
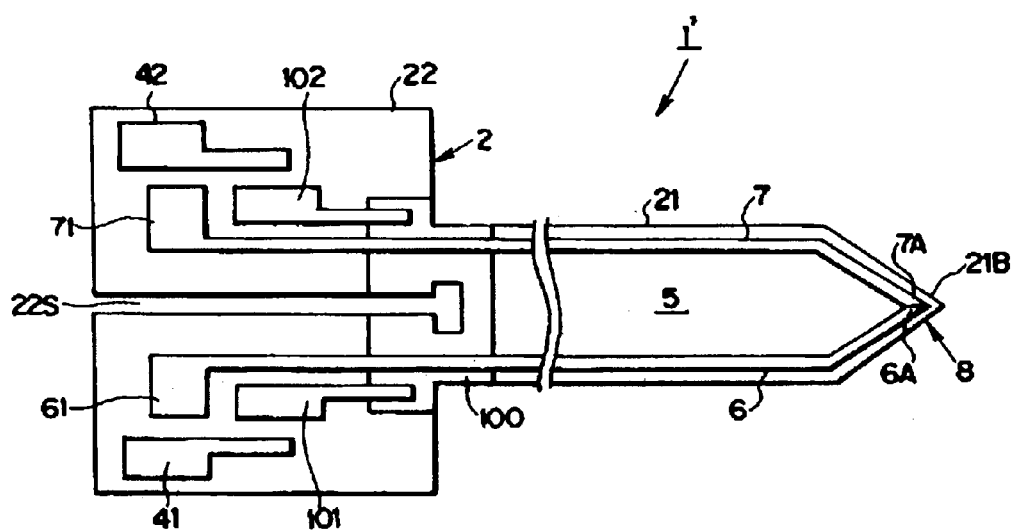
FIG. 9 is a plan view for showing another embodiment according to the present invention.

FIG. 9 shows another embodiment according to the present invention. Although a temperature measurement probe 1' shown in FIG. 9 is similar to the temperature measurement probe 1 shown in FIG. 1, the temperature measurement probe 1' is different from the temperature measurement probe 1 in, that a piezoelectric resistor element 100 as an electro-flexural conversion element for converting a flexural amount of the cantilever section 21 into an electric charge is provided at the basal part of the cantilever section 21 of the temperature measurement probe 1'. Accordingly, among each part of the temperature measurement probe 1' shown in FIG. 9, the same reference numerals are given to the parts corresponding to each part of the temperature measurement probe 1, and its explanation is herein omitted.

The piezoelectric resistor element 100 serves to electrically detect the flexural amount at the basal part of the cantilever section 21, and the piezoelectric resistor element 100 is connected to an external flexure detection circuit (not illustrated) via a pair of electrodes 101 and 102, which is formed on the cantilever section 21. In this case, a slit 22S is formed at the basal part 22 as shown in the drawing. This allows the basal part of the cantilever section 21 to be more flexible as compared to the case of the temperature measurement probe 1.

Accordingly, in the temperature measurement using AFM, when the cantilever section 21 is bent, an electric signal in accordance with this is capable of being picked up from the piezoelectric resistor element 100, so that the information with regard to a distance between the surface of the sample (not illustrated) and the front end portion 21B may be detected without using a detector using an optical lever.

As a result, the irradiation to the front end portion 21B of a laser beam that is required upon employing this optical lever structure becomes unnecessary. This provides an advantage such that, without heating the front end portion 21B by the laser beam, the temperature measurement is capable of being performed with a high degree of accuracy.

According to any embodiments as described above, the temperature measurement probe is installed at a temperature measurement probe position control stage of a probe supporting portion via a predetermined fixture to be mechanically fixed and supported thereto, and further, a predetermined electrical connection between the temperature measurement probe and an electric unit for measurement is formed. Then, a sample set on a sample table, which is arranged opposed to the probe supporting portion, and the temperature measurement probe are opposed with each other, and the temperature measurement is carried out in a minute scale using AFM when the temperature measurement probe scans the surface of the sample. In this way, the measurement of the thermal physicality in the minute region of the surface of the sample is performed with high degree of accuracy and with high respondency, and the heat distribution mapping is manufactured in the minute region of the surface of the sample.

According to the present invention, as described above, in a temperature measurement probe, in which a measurement element for measuring a temperature and a heating element for heating the foregoing measurement element are provided at a front end portion of a cantilever, the foregoing measurement element and the foregoing heating element are formed so as to be superposed with each other on a main face via an electrical insulating layer, so that the wiring portion on the cantilever of the temperature measurement probe has a two-layered structure, in which the two layers are electrically isolated with each other, the thermoelectric couple and the resistor element for heating are formed on other wiring layer, and the thermoelectric couple and the resistor element for heating are arranged so that they are superposed with each other on a substantially same position on the cantilever. Therefore, it is possible to dispose the both together on the main face of the cantilever, at a position that is most suitable for the measurement. As a result, even if the electric energy supplied to the heating element is reduced, it is possible to effectively supply the amount of heat necessary for measurement to the measurement element. Therefore, by minimizing the heat to be supplied to the sample and the cantilever, the respondency of measurement is capable of being improved noticeably.

Further, since the temperature measurement probe further comprises a self-detecting type temperature measurement probe, in which an electro-flexural conversion element for detecting a flexural amount of the foregoing cantilever is formed on the foregoing probe, as compared to a structure such as an optical lever such that the external energy for detection is supplied to the cantilever to increase a temperature of the cantilever, the number of elements for increasing the temperature of the cantilever is capable of being decreased, so that the improvement of the measurement accuracy may be expected.

In addition, when a pair of measurement elements is provided on the main face of the cantilever at the opposite sides of the heating element, it is possible to further raise the accuracy of measurement.

According to the temperature measurement apparatus, in which, by using the temperature measurement probe, the temperature measurement is carried out in a minute scale using AFM when the temperature measurement probe scans the surface of the sample, the measurement of the thermal physicality in the minute region of the surface of the sample is performed with high degree of accuracy and with high respondency, and the heat distribution mapping is manufactured in the minute region of the surface of the sample with high degree of accuracy and with rapidity.

What is claimed is:

1. A self-detecting type cantilever for an atomic force microscope (AFM) comprising:

an electro-flexural conversion element for converting a flexural amount of the cantilever into an electric current or voltage;

a temperature measurement element disposed at a front end portion of the cantilever for measuring a temperature; and a heating element disposed at the front end portion of the cantilever for heating the temperature measurement element;

wherein the temperature measurement element and the heating element are superposed with each other on a main face of the cantilever via an electrical insulating layer, and the temperature measurement element includes a pair of measurement elements provided so as to sandwich the heating element.

2. A self-detecting type cantilever according to claim 1, wherein a distance from each of the pair of measurement elements to the heating element is the same.

3. A self-detecting type cantilever according to claim 1, wherein the heating element comprises a metal film wire provided on the main face.

4. A self-detecting type cantilever according to claim 3, wherein the electrical insulating layer is formed on the main face so as to cover the metal film wire.

5. A self-detecting type cantilever according to claim 4, wherein the temperature measurement element comprises a thermoelectric couple comprised of a pair of metal film wires formed on the electrical insulating layer and having front end portions superposed with each other.

* * * * *